Patented Apr. 28, 1942

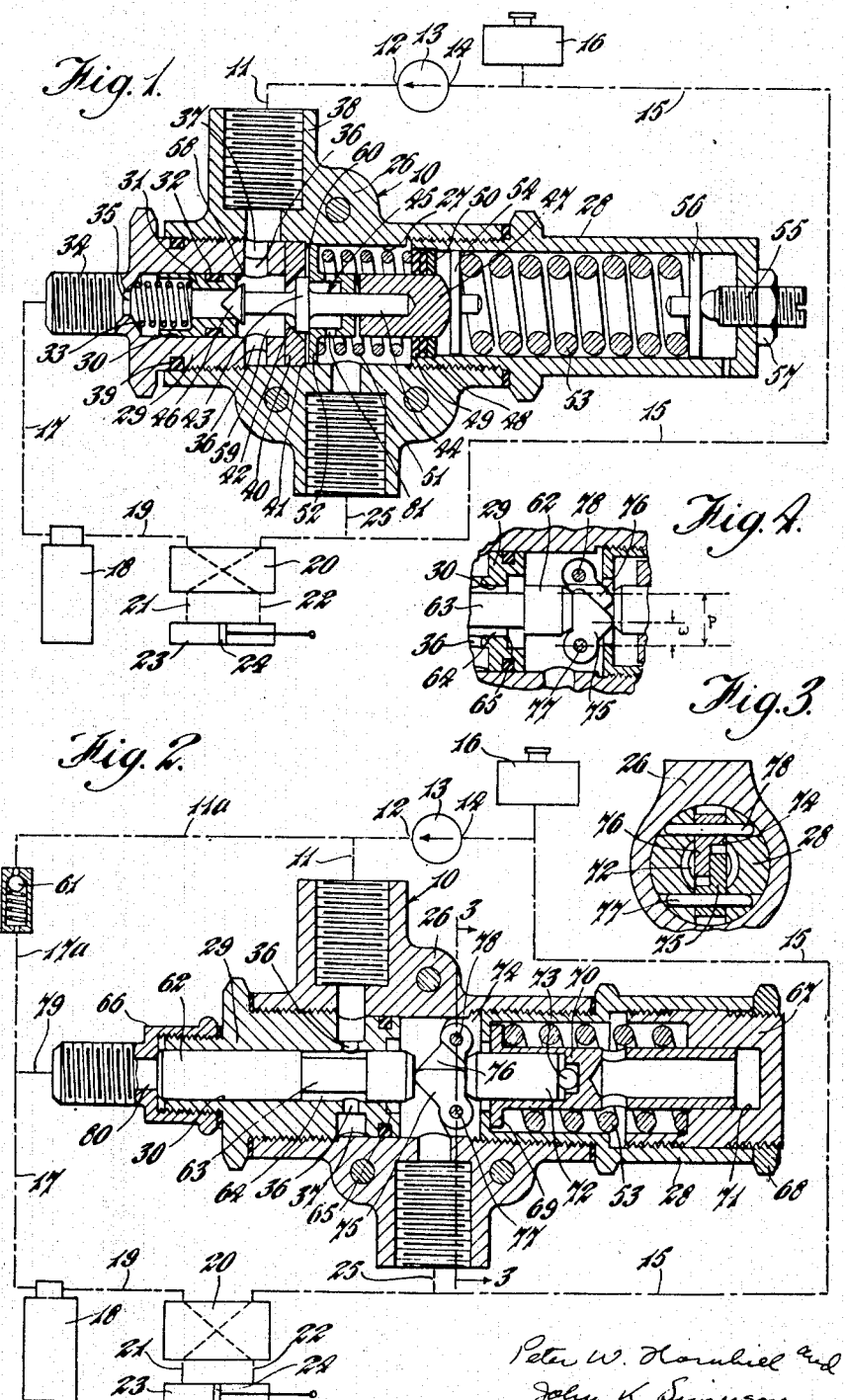

2,280,937

UNITED STATES PATENT OFFICE 2,280,937

PRESSURE REGULATING DEVICE FOR FLUID SUPPLY SYSTEMS

Peter Warborn Thornhill and John Keith Simpson, Leamington Spa, England, assignors to Automotive Products Company Limited, Leamington Spa, Warwickshire, England Application April 25, 1941, Serial No. 390,418
In Great Britain February 26, 1940

3 Claims. (Cl. 137—153)

This invention relates to pressure regulating devices and it has for its object to provide improvements in pressure regulating devices of the known kind (hereinafter mentioned as "the kind referred to") in which a blow-off valve is arranged to connect a constantly driven pump with a reservoir or vent when the pressure of the fluid which is normally delivered by said pump through a non-return valve to an accumulator or other device, reaches a predetermined value, the fluid pressure at that side of the non-return valve remote from the pump being arranged to hold the blow-off valve open until a predetermined reduction has occurred in the fluid pressure of the accumulator or equivalent.

In particular it is the object of the invention to provide a compact and efficient form of pressure regulating device in which the operation of the blow-off valve is decisive and in which the difference between the accumulator or equivalent pressure serving to open the blow-off valve, and the pressure at which the blow-off valve recloses, may be made relatively small.

In a pressure regulating device of the kind above referred to, according to the invention the force exerted by the pressure fluid and tending to urge the blow-off valve towards its open position, is counteracted by a spring device which is arranged so that the closing force it exerts upon the blow-off valve when the latter is in its fully closed position, is substantially greater than the force which said spring device applies to the blow-off valve when the latter is open. The use of a spring device having this action enables the blow-off valve to open in a decisive manner so as to avoid wire-drawing of the fluid, the whole device being light and compact and being particularly suitable for inclusion in the liquid pressure remote control systems which now commonly form part of air and other craft.

There is further provided according to the invention a pressure regulating device of the kind referred to, wherein the blow-off valve is balanced with respect to the pressure fluid disposed between the pump and the non-return valve, or else tends to be urged open by said pressure fluid, said blow-off valve being closed by a spring device which is arranged so that the force it exerts upon the blow-off valve when the latter is in its closed position is substantially greater than the force which said spring device applies to the blow-off valve when the latter is open.

As a feature of the invention, in a pressure regulating device of the kind referred to a plurality of springs are caused normally to act on the blow-off valve to hold it closed against the pump pressure, but the latter, upon increasing sufficiently to open the blow-off valve and pass therethrough, acts upon a piston or equivalent member which removes the force of at least one of said springs from the blow-off valve so as to enable said valve to open easily to its full extent under the influence of the pressure fluid in the accumulator or equivalent.

Further, in a pressure regulating device of the kind above referred to, according to the invention a spring device, which serves to hold the blow-off valve closed against the fluid pressure in the accumulator or equivalent, is arranged so that the force which it exerts upon a valve member of the blow-off valve decreases as said member moves to its open position.

Preferably the blow-off valve comprises an axially slidable valve member which is urged closed by a main spring acting directly on said valve member, and by an auxiliary spring acting upon a piston member, which latter is slidably mounted relative to the valve member and is arranged to be acted upon by pressure fluid when the valve member opens, so that said piston member compresses the auxiliary spring and removes the force thereof from the blow-off valve member. The blow-off valve member may have, intermediate its length, a radial flange which is arranged to close an annular seating of the blow-off valve, and which is urged towards said seating by the piston member, under the action of the auxiliary spring. If desired the non-return valve may have a valve member which is common to the blow-off valve, said valve member conveniently engaging at its end with an annular seating formed upon a sleeve, which latter is axially slidable in a fluid-tight manner within a passage leading from the pump to the accumulator or equivalent, so that when the seating is engaged, the said passage is completely closed. Thus the fluid pressure in the accumulator or equivalent may act upon the sleeve and the end of the valve member conjointly, to hold the valve member against the action of the main spring, when the blow-off valve is open. The diameter of the flange on the valve member is preferably slightly smaller than the outside diameter of the sleeve, so that the pressure of the fluid in the accumulator or equivalent, acting upon the sleeve and the adjacent end of the valve member, can easily shift the latter to its open position when once the opening movement has been started by the pump delivery pressure acting on the area of the flange.

In another arrangement a variable leverage device is operatively interposed between the blow-off valve and the spring serving to load said valve, said variable leverage device conveniently comprising a substantially triangular member which is pivoted at one angle to the body of the pressure regulating device, and has its other two angles in engagement, respectively, with the spring device, and with a member acted upon by the fluid pressure in the accumulator or equivalent, the arrangement being such that as the stress in the spring device is increased, the leverage afforded by the triangular member is also increased, but to a greater extent, so that the force applied by the spring device to the valve member is actually reduced. If desired a pair of substantially triangular members may be arranged in overlapping relationship, said members being pivoted to the body at diametrically opposite positions. Further, the blow-off valve may comprise a plunger arranged to slide axially within a bore, under the action of the pressure fluid in the accumulators or equivalent, and having a groove or other recess, which latter is in permanent connection with the pump delivery, and which, as the plunger slides, is arranged to pass beyond the end of the bore so as to allow the fluid to escape at low pressure from the pump.

The invention is illustrated by way of example in the accompanying drawing, in which:

Figure 1 shows a sectional elevation of one form of pressure regulating device, the associated parts of a liquid pressure remote control system being indicated diagrammatically;

Figure 2 is a similar view but showing a modified construction of pressure regulating device;

Figure 3 is a fragmentary sectional elevation taken on the line 3—3 of Figure 2; and Figure 4 is a fragmentary sectional elevation of the variable leverage device included in Figure 2, the parts being in the positions which they occupy when the blow-off valve is open.

The pressure regulating valve device is indicated generally at 10 in Figure 1, and is connected by a pipe 11 with the delivery connection 12 of a continuously driven pump 13, the inlet connection 14 of which latter is connected with a return pipe 15 and with a reservoir 16 for spare working liquid. A pressure outlet pipe 17 leads from the device 10 to a hydraulic accumulator 18, while the outlet from the latter is connected by a pipe 19 with a selector valve device 20. From this a pair of interchangeable flow and return pipe lines 21 and 22 lead to a double-acting slave cylinder unit 23, the piston 24 of which is adapted to be moved positively in either direction, depending upon the setting of the selector valve 20. The return pipe 15, of course, leads from the selector valve 20 and is connected at 25 with the pressure regulating device 10.

The pressure regulating device 10 comprises a body 26 which is formed with a longitudinal bore 27, the latter being screw-threaded at one end for the reception of a spring housing 28 and at its other end for a plug member 29. The latter is itself formed with an axial bore 30, within which a sleeve 31 is slidably mounted, said sleeve being provided with a packing ring 32 upon its outside for the purpose of preventing leaking of liquid. The sleeve 31 is recessed for the accommodation of a light coiled compression spring 33 serving to urge said sleeve 31 towards the right, as seen in Figure 1. The plug 29 has a screw-threaded spigot 34 adapted for connection to the pipe 17 and a passageway 35 through this spigot leads to the inside of the sleeve 31. The bore 30 in the plug 29 is placed in communication with the pipe 11 by means of a series of radial holes 36, an annular groove 37 and a connection boss 38. The plug 29, which has a packing ring 39 to prevent leakage of liquid, bears at its end against an annular seating member 40 and holds the latter securely in position against a shoulder 41 in the bore 27.

The seating member 40 has its surface 42 bounding a central aperture of countersunk shape so as to act as a seating for the adjacent relatively sharp edge of a radial flange 43 formed on the stem 44 of a valve member, which latter is indicated generally at 45. At its left-hand end the stem 44 is formed with a conical head 46 adapted to engage the edge of the internal curved surface of the sleeve 31 and thus completely close the passageway through said sleeve. The opposite end of the stem 44 is fitted with a substantially cylindrical block 47, which is arranged to slide through a rubber or other resilient packing washer 48, the latter being supported between a pair of metal washers 49 and 50 which have appreciable clearance relative to the block 47 so as to permit the valve member 45 to move into accurate alignment with either the sleeve 31 or the seating member 40, depending upon whether the blow-off valve 40, 43 is open or closed.

The washers 49 and 50 are held in position by an auxiliary coiled compression spring 51, which, at its other end, bears against a piston member 52. This member is adapted to engage with the radial flange 43 of the valve member 45 and its periphery is a smooth sliding fit within the bore 27. No packing means are provided, however, as it is desired that a slight leakage of liquid past the piston member 52 should be permitted.

The cylindrical block 47 of the valve member 45 is urged towards the left by a main spring 53 acting through a plate 54, the force exerted by the main spring 53 being adjustable owing to the provision of a grub screw 55 which bears against an abutment plate 56 and is provided with a lock nut 57.

The action of the device shown in Figure 1 is as follows. The sleeve 31, acting in conjunction with the head 46, constitutes the customary non-return valve disposed between the pump 13 and the hydraulic accumulator 18, while the flange 43, co-operating with the seating member 40, serves as the blow-off valve, which, when open, permits the delivery from the pump 13 to flow freely back to the inlet 14 by way of the return pipe 15. It will be seen that the flange 43 is normally held firmly against the seating member 40 by the main spring 53 acting through the valve stem 44, and at the same time by the auxiliary spring 51 acting upon the piston member 52. As a result the liquid delivered under pressure by the pump 13 through the pipe 11 acts upon the end surface 58 of the sleeve 31, and by urging the latter to the left against the spring 33 is able to flow through the pipe 17 and into the accumulator 18. As the accumulator becomes charged, the pressure of the liquid in the pipe 11 and in the annular space 59 increases until said liquid, acting simultaneously upon the left-hand surface of the flange 43 and upon the conical surface of the head 46, is able to overcome the combined force of the main spring 53 and the auxiliary spring 51. When this state is reached the valve member 45 moves to the right, and immediately a gap occurs between the flange 43 and the surface 42 of the seating member 40 the pressure liquid flows through into the space 60 at the back of said seating member and is able to act upon the adjacent radial surface of the piston member 52. This surface is relatively large, so that the pressure liquid is easily able to move the piston member 52 to the right against the force exerted by the auxiliary spring 51, and owing to the consequent separation of the piston member 52 and the flange 43 a drop in pressure occurs in the annular space 59, so that the sleeve 31 moves back into engagement with the head 46. The pressure liquid in the pipe 17 is thus able to act upon the valve member 45 over an area corresponding to that of the bore 30, the force so produced tending to move the valve member 45 towards the right. This force is, moreover, only resisted by the main spring 53, for the liquid pressure acting upon the piston member 52 is quite sufficient to hold the auxiliary spring 51 in a compressed state. It follows therefore that the valve member 45 is moved decisively to its fully opened position, and it will be noted that in this state the force exerted by the spring 53 tending to close the valve is substantially less than the force produced by the springs 53 and 51, which act in combination upon the valve member 45 when the latter is in its closed position. As the pressure in the accumulator 18 drops, there comes a time when the force upon the sleeve 31 and head 46 is unable to resist the spring 53, and the valve member 45 therefore moves to the left and assumes its closed position. The liquid within the space 60 is able to escape through apertures 81 in the piston member 52, so that the parts resume the positions shown in Figure 1 and the liquid delivered by the pump 13 has its pressure built up and is utilised for recharging the accumulator 18.

In the modified form of device shown in Figures 2 to 4 the reduction in the effective force of the main spring as the blow-off valve opens is secured by a variable leverage device. The pressure regulating device is again indicated at 10 and the parts of the remote control system are the same as before, except that a non-return valve unit 61 is provided separately from the device 10 and is connected between the pipes 11 and 17 by means of pipes 11a and 17a respectively. The plug 29 is again provided with a bore 30, which communicates with the pipe 11 by way of radial holes 36 and an annular groove 37. The bore 30 contains an axially slidable piston valve member 62, which is a substantially liquid-tight fit within the bore 30 and is formed with a waist portion 63, the annular space 64 surrounding which is in permanent communication with the holes 36. The piston valve member 62 is adapted to slide to the right, and when the waist portion 63 extends beyond the edge 65 of the plug member 29, as shown in Figure 4, free communication is established between the pipe 11 and the return pipe 15.

The piston valve member 62 is normally urged towards its left-hand position against a stop cap 66 by means of a main spring 53 contained within a spring housing 28. The latter has an adjustable plug 67 against which the outer end of the spring 53 butts, a lock nut 68 being provided to preserve the axial adjustment of the plug 67. The inner end of the main spring 53 engages a flange 69 upon a plunger 70, which latter slides within a bore 71 formed in the plug 67 and is engaged by a substantially cylindrical thrust member 72 through the medium of a ball 73. The spring housing 28 is formed at its inner end with a diametral groove 74, which accommodates a pair of substantially triangular lever members indicated at 75 and 76 respectively, said members being pivoted at diametrically opposite positions by means of transverse pins 77 and 78 respectively. It will be noticed that in each case the pivot pin is disposed adjacent one angle of the corresponding triangular lever member, while the other angles engage respectively with the piston valve member 62 and with the thrust member 72, the lever members 75 and 76 being cut away, as will be seen in Figure 3, so as to enable them to be arranged in overlapping relationship.

With the parts in the positions shown in Figure 2, the blow-off valve constituted by the piston valve member 62 and the plug 29 is closed and consequently the pressure liquid delivered by the pump 13 passes through the pipe 11a, the non-return valve device 61, and pipes 17a and 17 to the hydraulic accumulator 18. This pressure liquid, by passing through a connection 79, gains access to a space 80 bounded by the end surface of the piston valve member 62, so that the pressure of said liquid acts to force the piston valve member 62 towards the right. The main spring 53 is so adjusted by means of the plug member 67 that when an appropriate pressure is reached in the hydraulic accumulator 18, the force on the piston valve member 62 acting through the lever members 75 and 76 is able to overcome the force exerted by the spring 53. As the latter contracts, the lever members 75 and 76 move angularly about their pivots 77 and 78, with the result that the piston valve member 62 is given a progressively increasing mechanical advantage with respect to the thrust member 72 and plunger 70. Thus, referring to Figure 4, it will be seen that in the case of the lever member 75, the point of contact between said member and the piston valve member 62 progressively rises, whereas the point of contact between the lever member 75 and the thrust member 72 progressively falls. Indeed, with lever members of the isosceles-rightangled-triangular-shape shown in the drawing, a leverage ratio of 2 to 1 is obtained by the time that the piston valve member 62 is moved fully to the right, as will be seen in Figure 4, the distance between the pivot and the line of action of the effort (indicated at $p$) being substantially equal to twice the corresponding distance of the load (indicated at $w$). The mechanical advantage afforded by the lever members 75 and 76 is arranged to increase at a substantially greater rate than the force exerted by the main spring 53 increases, so that when the piston valve member 62 commences to open under the action of the force exerted by the liquid in the space 80, said opening movement is counteracted by progressively decreasing resistance, with the result that the valve opens decisively and, moreover, remains fully open until the pressure in the space 80 has dropped to such a value that the spring 53 is able to overcome it. The variable leverage device constituted by the lever members 75 and 76 can, of course, be readily designed to give any desired difference between the pressure at which the piston valve member 62 is closed and that at which it subsequently opens.

Besides being applicable in conjunction with the charging of hydraulic accumulators, the pressure regulating device according to the invention is especially useful in cases where a slave unit is fed with pressure liquid directly from a continuously running pump, for when the piston reaches the end of its stroke the consequent pressure rise in the liquid supplied by the pump can be utilised to operate the valve member (such as 45 or 62) so as to place the pump delivery in communication with the pump inlet, at the same time maintaining the pressure in the slave unit.

The invention may of course be applied to other constructions of pressure regulating device apart from those given by way of example.

What we claim is:

1. A device for the regulation of fluid pressure in a reservoir supplied thereto by a pump, compressor or the like comprising an axially movable valve adapted to open under the influence of a predetermined pressure, resilient means urging said valve to its closed position, a piston member slidably mounted relative to and normally abutting said valve and arranged to be acted upon by pressure fluid when the valve member opens, and a second resilient means associated with said piston member for holding the valve and piston member in their closed positions so constructed and arranged that as the valve opens under the influence of pressure the piston will compress the second resilient means and remove all force thereof from the valve.

2. A device for the regulation of fluid pressure in a reservoir supplied thereto by a pump, compressor or the like comprising an axially slidable valve member having a radial flange intermediate its length, an annular detachable member having an inclined seating surface cooperating with said flange, resilient means urging said flange against said seat, means normally abutting said flange and slidably mounted relative to the valve member and arranged to be acted upon by pressure fluid when the flange opens, and a second resilient means acting through the abutting means to urge the flange to closed position so constructed and arranged that said abutting means will, under the influence of pressure, compress the second resilient means and remove all force thereof from the flange once the latter has opened.

3. A device for the regulation of fluid pressure supplied to a reservoir by a pump, compressor or the like comprising means having a sleeve forming a valve seat, an axially slidable valve member having a radial flange intermediate its length, a sealing head formed on one end of said member and cooperating with said valve seat, an annular seat cooperating with said flange, resilient means urging said flange against said annular seat, a piston normally abutting said flange and movably mounted relative to said member and arranged to be acted upon by fluid pressure when the flange is unseated, and a second resilient means urging said piston and said flange to closed positions, so constructed and arranged that said piston will, under the influence of pressure, compress the second resilient means and remove all force thereof from the flange once the latter has opened.

PETER WARBORN THORNHILL.
JOHN KEITH SIMPSON.